United States Patent [19]
Garcia

[11] 3,747,059
[45] July 17, 1973

[54] ELECTRONIC NOISE FILTER WITH MEANS FOR COMPENSATING FOR HOSE REFLECTION

[75] Inventor: Donald J. Garcia, Houston, Tex.

[73] Assignee: Schlumberger Technology Corporation, New York, N.Y.

[22] Filed: Dec. 18, 1970

[21] Appl. No.: 99,433

[52] U.S. Cl. .................. 340/18 LD, 340/18 NC
[51] Int. Cl. ........................................ G01v 1/22
[58] Field of Search ........................ 340/18 LD; 340/18 NC

[56] References Cited
UNITED STATES PATENTS
3,555,504  1/1971  Fields ................ 340/18 LD
3,302,457  2/1967  Mayes ............... 340/18 LD
2,925,251  2/1960  Arps .................. 340/18 LD Primary Examiner—Samuel Feinberg
Assistant Examiner—N. Moskowitz
Attorney—Ernest R. Archambeau, Jr., Stewart F. Moore, David L. Moseley, Edward M. Roney and William R. Sherman

[57] ABSTRACT

An illustrative embodiment of the present invention includes methods and apparatus for detecting pressure pulse signals from a remote signalling device in the mud line of a well while the well is being drilled and in the presence of mud pump pressure pulse noise. The apparatus and method includes placing plural pressure sensitive transducers in the mud line on the mud pump side of the flexible hose portion thereof. Electrical signals representative of the pressure in the mud line sensed by the transducers are processed to take into account the amplitude and phase shift effect of the hose. The processed signals are then combined to directionally discriminate against the mud pump noise pulses wihie detecting pulses from downhole.

10 Claims, 4 Drawing Figures

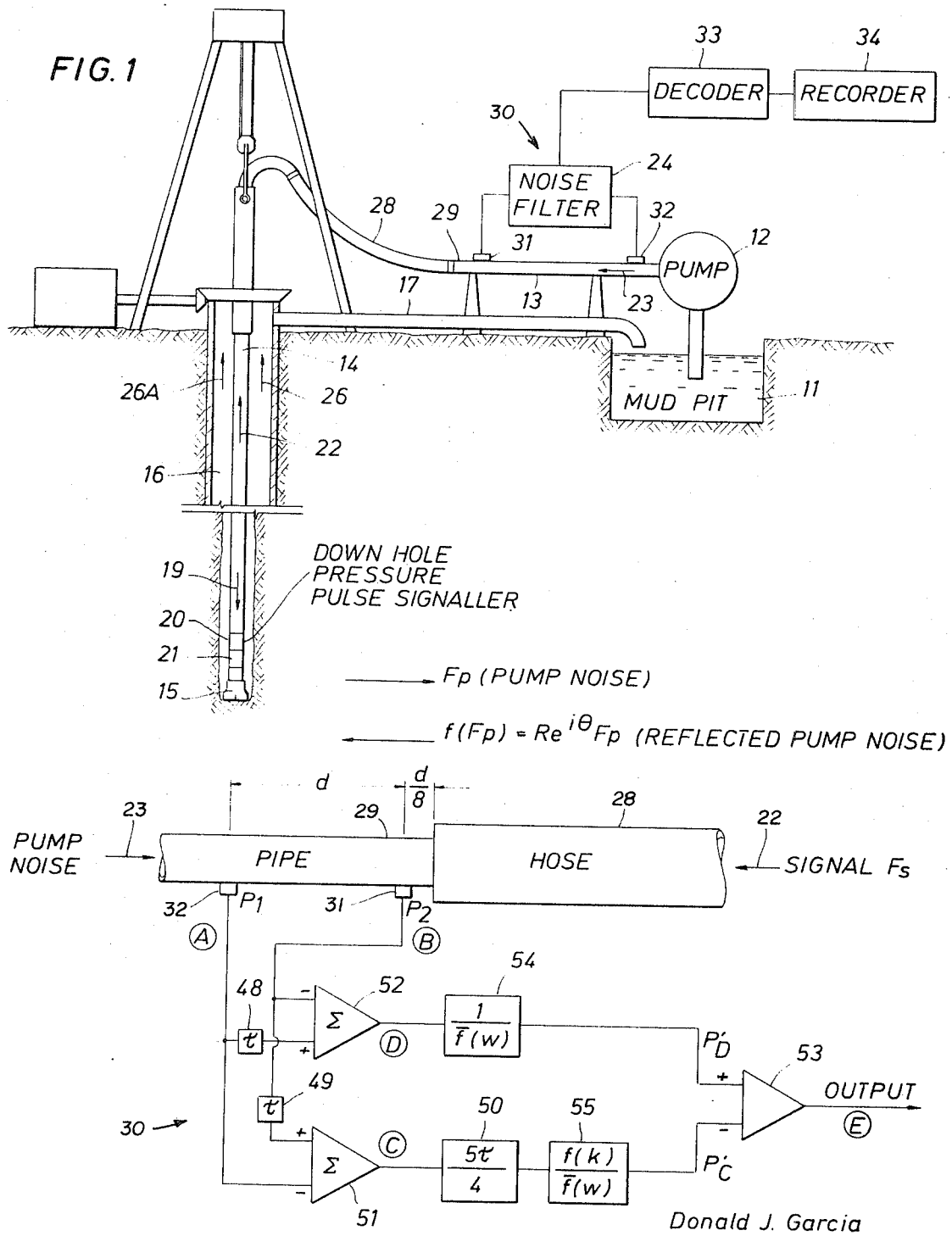

PULSE TRAVELING DOWNSTREAM

PULSE TRAVELING UPSTREAM

Donald J. Garcia
INVENTOR

BY William J. Beard

ATTORNEY

ELECTRONIC NOISE FILTER WITH MEANS FOR COMPENSATING FOR HOSE REFLECTION

BACKGROUND OF THE INVENTION

This invention relates to data transmission systems and more particularly to data transmission systems for use in transmitting data from the bottom of a well bore to the surface while drilling the well.

It has long been recognized in the oil industry that the obtaining of data from downhole during the drilling of a well would provide valuable information which would be of interest to the drilling operator. Such information as the true weight on the bit, the inclination of the borehole, fluid pressure and temperature at the bottom of the hole and the radioactivity of substances surrounding or being encountered by the drill bit would all be quantities of interest to the drilling operator. A number of prior art proposals to measure these data while drilling and to transmit information pertaining to such data to the surface have been made. Various transmission schemes have been proposed in the prior art for so doing. Among these prior art proposals has been the use of the drill pipe as an electrical conductor to transmit electrical signals to the surface, the transmission of sonic signals to the surface through the drill pipe, the release of radioactive or colored dye markers in the circulating drilling fluid and several schemes of pressure pulse signalling in the drilling fluid. None of these prior art proposals have led to a practical solution of the transmission problem for various reasons.

Perhaps the most promising of these prior art suggestions in a practical sense has been that of signalling by pressure pulses in the drilling fluid. However, this approach has suffered the limitation of having the presence of a high ambient noise level in the signalling system because of pressure pulses introduced into the drilling fluid by the mud pumping system which is used to circulate drilling fluid. In a typical drilling arrangement, a large pump located at the surface is used to pump drilling mud down the drill stem, through the bit, and back to the surface in the annulus between the drill pipe and the wall of the well bore. Such pumps may typically require power inputs of several hundred horsepower and circulate drilling mud at a rate of 10 to 15 barrels per minute.

Typically, such pumps operate by having a large reciprocating piston which the mud down from the surface through the drill stem and into the well bore. The pressure inpulses produced by these pumps can interfere with the reception of relatively lower level pressure pulses from a downhole pressure pulse signalling system which is associated with the downhole measuring equipment in a measuring while drilling system.

Effective methods and apparatus such as that disclosed in U.S. Pat. No. 3,488,629, which is assigned to the assignee of the present invention, have been used in the prior art to remove the pump pressure impulses from the system by cancellation of these pressure pulses based on a directionally discriminational filtering system. However, such filtering systems as disclosed in the above-mentioned patent while effectively cancelling most of the large pressure pulses due to the mud pump have suffered slight limitations due to the discontinuities present in the mud circulation system. Sharp angled corners in the surface piping system used to supply mud from the pump to the rotary swivel or the use of a flexible portion of hose or the like ahead of the rotary swivel can cause reflection of a portion of the mud pump pulses back toward the pump.

Stating this problem from a slightly different viewpoint the different acoustic impedances of tubing used in various parts of the mud circulation system can cause smaller amplitude acoustic reflections to appear in the system. For example, if the noise filter pressure input pickups are placed on the pump side of the flexible hose connection from the metallic tubing to the rotary swivel as disclosed in the above-mentioned patent then such reflections caused by the acoustic impedance mismatch between the flexible hose and the metal tubing can interfere with detection of pressure pulses arriving from the downhole pressure signalling apparatus as sensed by a highly sensitive electronic system such as that used in the present invention. Different transducer placement can be used to avoid this but this can lead to other problems such as coupling the detected signals from a moving portion of the system.

Accordingly, it is an object of the present invention to provide improved noise filtering apparatus which processes sensed pressure transducer signals to eliminate the effect of reflection caused by the acoustic impedance mismatch at the interface between the metal portion of the mud circulation system and the flexible hose which delivers the mud from the tubing portion to the rotary swivel portion of the circulation system.

Another object of the present invention is to effectively suppress small transitory reflections caused by the acoustic impedance mismatch of the flexible hose portion of the mud circulatory system by improved signal processing techniques which include removing the effect of such transitory reflections in the process of filtering the mud pump impulses.

BRIEF DESCRIPTION OF THE INVENTION

In accordance with the objects of the present invention, an improved directionally discriminational pressure wave noise filter is supplied which effectively cancels the pressure pulse noise due to the mud pump and permits downhole pressure pulse signals from a measuring instrument to be detected at the surface while simultaneously processing pressure transducer signals to compensate for pump pressure pulse reflections caused by the flexible mud line portion of the mud circulation system. Pressure sensitive transducers are placed at longitudinally spaced locations on the mud pump side of the flexible mud hose portion of the mud circulation system at specified distances from the hose. Due to the acoustic impedance mismatch between the flexible hose portion of the mud circulation system and the metal tubing portion, a small part of the energy of pressure impulses or travelling pressure waves due to the mud pump is reflected, for example, from the end of the flexible mud line nearest the pump back toward the pump. This reflected energy causes an amplitude change and a phase shift in the pressure wave sensed by the spaced transducers. By appropriate signal processing based on the prior information available about the geometry of the mud system and the transducer spacing, the transducer signals may be rendered to a form suitable for combination to compensate for this effect. By properly combining the processed signals as detected at the spaced transducers on the mud pump or "upstream" side of the flexible hose, the signals coming from the direction of the downhole signalling apparatus are detected. Appropriate circuit means for performing this signal processing and combination is disclosed.

The novel features of the present invention are set forth with particularity in the appended claims. The present invention both as to its organization and manner of operation together with further objects and advantages thereof may best be understood by way of illustration and examples when taken in conjunction with the accompanying drawings in which:

BRIEF DESCRIPTION OF THE DRAWINGS

FIG. 1 is a schematic illustration showing the present invention in use in conjunction with a downhole pressure pulse signalling device;

FIG. 2 is a schematic illustration showing the present invention attached to the mud circulation system with pressure transducers located at either end of the flexible hose portion thereof;

DESCRIPTION OF THE PREFERRED EMBODIMENT

Figure 3:
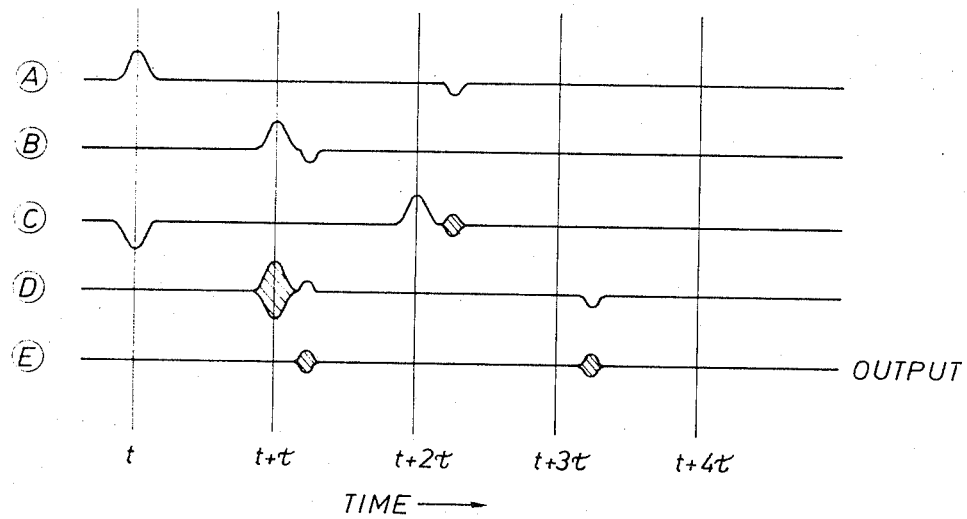
FIG. 3 is a timing diagram of the present invention showing its response to pulses travelling downstream from the surface to the bit.

Referring now to FIG. 1, the operation of the present invention in a typical drilling arrangement is illustrated schematically. Drilling mud is picked up from mud pit 11 by mud pump 12 which may be a pump of the reciprocating piston type. The mud is circulated through a mud line 13 containing a metallic pipe portion 29 and a flexible hose portion 28, down through the drill stem 14, through the bit 15 and back to the surface in the annulus 16 between the drill string and the wall of the well bore. Upon reaching the surface, the mud is discharged through line 17 into the mud pit 11 where cuttings of rock or other well debris are allowed to settle and to be further filtered before the mud is again picked up and recirculated by the pump 12.

A downhole pressure pulse signalling device 20 is located in the drill collars above the bit 15 for transmission of data signals derived during the drilling operation by a measurement instrument package 21. This package of measurement instruments may detect quantities of interest such as pressures, temperatures and flow rates of the mud in the portion of the borehole just above the bit during the drilling operation. The signalling device 20 may be of the valve or variable orifice type which generates pressure pulses in the drilling fluid by varying the speed of its flow or by momentarily stopping the flow. The measurement data may be encoded in a desired form by appropriate electronic means contained in the measurement instrument package 21 which, for example, may be powered by a downhole generator driven by the mud moving through an impeller type device or alternatively by downhole batteries. In any event, downhole pressure pulses generated by the signalling device 20 travel to the surface in the drill pipe and are represented by arrows 22 in FIG. 1 which illustrate the path taken by such pressure pulses under typical well conditions. The mud pump 12 also produces pressure pulses which travel in the opposite direction in the mud line. These are illustrated by the arrows 23 and 19. The arrows 26 and 26a illustrate the return flow of the mud in the annulus between the drill stem and the wall of the borehole as previously discussed.

In order for the downhole pressure pulse signals to be discernible at the surface some means must be provided to detect these relatively lower level pressure pulses and to effectively remove or cancel relatively larger pressure pulses due to the mud pump. Such a means has been disclosed previously in the earlier referenced U. S. patent. In this patent, a noise filter with two pressure pickups located on the pump side of the flexible hose 28 of the mud circulation system is disclosed. This noise filter discriminated against pump pressure impulses by effectively cancelling such pulses based on the direction of travel in the mud line of such pulses. However, the pump pressure impulses travelling down the metallic portion 29 of mud line 13, upon reaching the boundary between the flexible hose portion 28 and the metallic portion 29 of the line, have a portion of their energy reflected back toward the mud pump. When a significant reflection occurs, a noise filter such as disclosed in the previously mentioned patent cannot differentiate such relatively low amplitude reflections from the relatively low level information bearing mud pulses from downhole such as illustrated by arrow 22 of FIG. 1. By the use of the present invention the mistaken detection of such reflections as information bearing signals may be effectively suppressed.

In the present invention, a signal processing system 30 including an electronic noise filter 24 of FIG. 1 which is coupled to pressure transducers 31 and 32 located on the mud pump side of the flexible hose 28 may be used to take into account the reflection at the discontinuity existing between the flexible hose 28 and the metallic portion of the line 29. The signal processing system 30 takes into account the amplitude and phase shift introduced into pump pressure pulses as they traverse the flexible hose. This phenomenon effectively removes the reflected portion of such pump pulses impinging thereon. Output from the noise filter 24 is supplied to a decoding circuit 33 and then to a recording or display apparatus 34 for interpretation by the drilling operator. The output may, alternatively, be supplied to a drilling control computer if desired.

Referring now to FIG. 2, the flexible hose 28 is shown connected to the metallic pipe 29 in the drilling fluid circulation system. Pump noise impulses depicted as arrow 23 impinge on the system travelling from left to right and relatively lower amplitude signal pulses depicted by arrow 22 traverse the system from right to left. The signal processing system 30 is shown connected to the outputs of pressure transducers 32 and 31. This signal processing system 30, whose operation will be explained subsequently, functions to eliminate spurious detections caused by the partial reflection of pump pressure pulse noise at the acoustic impedance discontinuity caused by the boundary between the metallic portion 29 and the flexible hose portion 28 of the mud circulation system.

The signal processing system 30 is comprised of four signal channels A, B, C and D and an output channel E. It should be noted here, that for the sake of description, pressure transducers 31 and 32 are shown spaced a distance $d$ apart with the transducer 31 (that is closer to the hose) a distance $d/8$ from the hose. These distances could be varied and the resultant signal processing system would need only be changed by having the delay line elements thereof (48, 49 and 50) changed according to the new relative distances (i.e. since $\tau$ is the time required for the pressure pulse to traverse a distance $d$ in the following discussion of the operation of the signal processing circuit 30). The other elements comprising the signal processing circuits are summing circuits 51, 52 and 53 and multiplier circuits 54 and 55 which multiply the partially processed signal by a known quantity. Standard function forming circuits as known in the art may be used for this purpose.

Considering the steady state response of the system, the pump noise $F_p$ may be represented as a function of time by a travelling wave having amplitude A and frequency $\omega_p$, i.e.

$$\text{Pump Noise} = F_p = Ae^{i\omega_p t}$$

When the pump noise wave encounters the acoustic impedance discontinuity at the rubber hose, a portion of it is reflected. This reflected portion has a phase shift $\theta$, and an amplitude ratio R compared to the incident wave and may be represented as $$\text{Reflected Pump Noise} = f(F_p) = Re^{i\theta} Ae^{i\omega_p t}$$

Similarly, the signal $F_s$ arriving from the downhole signalling device may be represented as a travelling wave having amplitude B and frequency $\omega_s$ i.e.

$$\text{Signal} = F_s = Be^{i\omega_s t}$$

Figure 4:
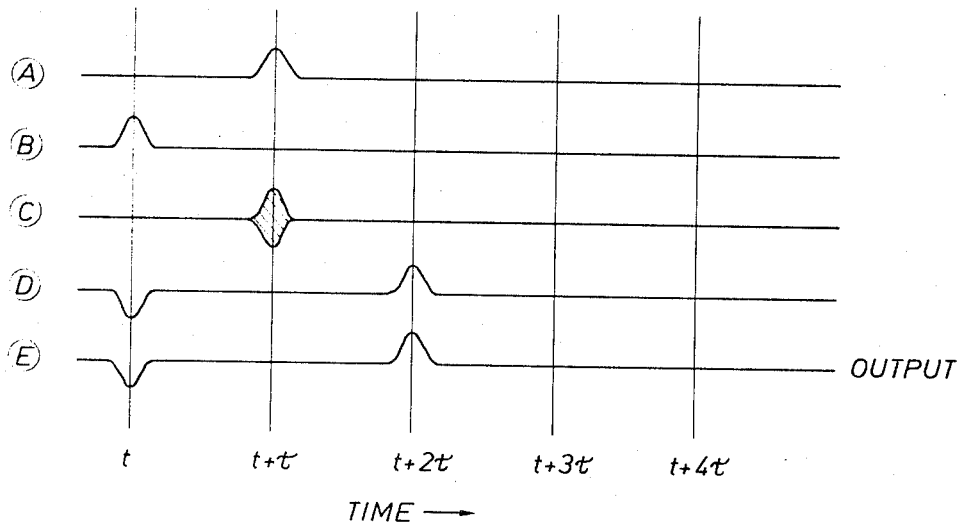
FIG. 4 is a timing diagram of the present invention showing its response to pulses travelling upstream from a downhole signalling device.

Now in conjunction with FIGS. 3 and 4, considering the channels of the signal processing apparatus sequentially we see that: (at an instant of time $t$)

Channel A sees the pump noise and the signal in real time and sees a noise reflection from the hose delayed by $(9\tau)/4$ (the time required for the pump noise pulse to reach the hose and return to pressure transducer 32). Mathematically this pressure function $P_A$ may be expressed as $$P_A = Ae^{i\omega_p t} + Re^{i\theta} Ae^{i\omega_p \left(\frac{t-9\tau}{4}\right)} + Be^{i\omega_s t}$$

Channel B sees the pump noise $F_p$ pulse $\tau$ seconds later than channel A, sees the $F_s$ signal $\tau$ seconds before channel A, and sees the reflected pump noise pulse $f(F_p)$ delayed by $5\tau/4$ seconds. This may be expressed as $$P_B + Ae^{i\omega_p(t-\tau)} + Re^{i\theta}Ae^{i\omega_p\left(\frac{t-5\tau}{4}\right)} + Be^{(i\omega_s t+\tau)}$$

Channel C at the output of the adder 51 sees the $P_A$ signal with sign reversed combined with $P_B$ which has delayed by $\tau$ seconds additionally due to the action of delay line 49. The resultant signal $P_c$ may be represented as $$P_c = P_B(t-\tau) - P_A = Ae^{i\omega_p(t-\tau)}[e^{-i\omega_p\tau} - e^{i\omega_p\tau}]$$

Similarly channel D at the output of the adder 52 sees $P_B$ with sign reversed combined with $P_A$ delayed an additional $\tau$ seconds by the action of delay line 48. The resultant signal $P_D$ may be represented as $$P_D = P_A(t-\tau) - P_B =$$
$$Re^{i\theta}Ae^{i\omega_p\left(t-\frac{9\tau}{4}\right)}[e^{i\omega_p\tau} - e^{i\omega_p\tau}] +$$
$$Be^{i\omega_s t}[e^{-i\omega_s\tau} - e^{i\omega_s\tau}]$$

Now if we define the function $f(K)$, the ratio of incident to reflected pump noise, as $$f(K) = f(F_p)/F_p = Re^{i\theta} =$$
$$\frac{a \cos kl - i(M_1 - a^2 M_2) \sin kl}{a(M_1 M_2 + 1) \cos kl + i(M_1 + a^2 M_2) \sin kl}$$

it may be shown that the quantities R (the amplitude ratio of reflected to incident wave) and $\theta$ (phase shift of the reflected wave relative to the incident wave) may be computed from the known elastic properties of the flexible hose to be:

$$R = \text{Mod } f(K)$$
$$\theta = \text{Arg } f(K)$$

In the above expressions $K = \omega/C$ the wave number of waves of frequency $\omega$ travelling at speed $C$ in the flexible hose: $M_1$ is the ratio of cross sectional area of the hose to the cross sectional area of the pipe "upstream" of the hose, $M_2$ is the ratio of the cross sectional area of the "downstream" pipe (not shown) to that of the hose, 1 is the length of the hose, and $a$ is the ratio of the speed of the waves in the flexible hose to the speed of the waves in the metallic pipe. Since all these quantities are known beforehand the function $f(K)$ may be precomputed and programmed as a constant for a particular frequency $\omega_p$ into the multiplier 55.

Here also the quantity $\bar{f}(\omega)$ which appears in multipliers 54 and 55 is defined for convenience as $$\bar{f}(\omega) = e^{-i\omega\tau} - e^{i\omega\tau} = 2i \sin \omega\tau$$

where $\omega$ and $\tau$ have been previously defined.

Finally, the output of the filter of FIG. 2 (i.e. the contents of channel E of FIGS. 3 and 4) is seen to be equal to the combination of a signal $P'_c$ ($P_c$ delayed by an additional $(5\tau)/4$ seconds by the action of delay line 50 and multiplied by the ratio $f(k)/\bar{f}(\omega)$ by multiplier 55) with reversed sign and a signal $P'_D$ which represents $P_D$ multiplied by $1/\bar{f}(\omega)$. Expressed quantitatively this output quantity is given by $$P_E = \frac{1}{\bar{f}}[P_D] - \frac{1}{\bar{f}}\left[P_c\left(t-\frac{5\tau}{4}\right)\right] =$$

$$P_E = Be^{i\omega_s t} \frac{e^{-i\omega_s\tau} - e^{i\omega_s\tau}}{e^{-i\omega_p\tau} - e^{i\omega_p\tau}} =$$

$$P_E = F_s \frac{\sin(\omega_s\tau)}{\sin(\omega_p\tau)}$$

Summarizing, it is seen that the net result of the filter action is to produce an output signal $P_E$ which is proportional only to the downhole signal $F_S$ and from any interference due to the reflected pump noise signal $f(F_p)$ is eliminated. This effect is achieved by mathematically manipulating of processing the signals sensed at spaced pressure transducers on the mud pump or "upstream" side of the flexible hose portion of the mud circulation system. The processed signals are combined in a unique manner to eliminate spurious signal detection caused by reflections from the hose.

The foregoing disclosure may make other alternative but equivalent embodiments of the present invention obvious to those skilled in the art. It is the aim of the appended claims to cover all such changes and modifications as fall within the true spirit and scope of the present invention.

I claim:

1. Apparatus for detecting pressure pulse signals from a downhole signalling device in the mud circulation system of a drilling well, the mud circulation system having a mud pump and at least one hose section thereof possessed of different acoustic transmission properties from the tubing comprising other portions of the mud circulatory system, comprising:

means for sensing pressure pulses at at least two spaced points, a first point and a second point, in a drilling fluid line on the mud pump side of said hose section, said first point being further from said hose than said second point and generating signals representative thereof;

first signal possessing channel means for combining said representative signal from said first point delayed by a predetermined time with the undelayed representative signal from said second point;

second signal processing channel means for combining said representative signal from said second point delayed by a predetermined time with the undelayed representative signal from said first point and for further processing this combined signal by delaying it by a different predetermined time and by processing it to account for the acoustic transmission properties of said hose section; and means for combining the processed output signals of said first and second signal processing channel means to produce a final output signal proportional to signals arriving from said downhole signalling device and not indicative of mud pump pressure pulses reflected from said hose section.

2. The apparatus of claim 1 wherein said first signal processing channel means comprises signal subtracting means for subtracting the undelayed representive signal from said second point from the delayed representative signal from said first point and signal multiplier means for multiplying this combined signal by a predetermined function.

3. The apparatus of claim 2 wherein said predetermined function $K(\omega)$ by which the combined signal is multiplied is of the form $$K(\omega) = (e^{-i\omega\tau} - e^{i\omega\tau})^{-1} = \frac{1}{-2i}(\sin \omega\tau)^{-1}$$

where $\omega$ is the angular frequency of the pressure pulses from the mud pump and $\tau$ is the time required for such a pressure pulse to traverse the distance between said first and second spaced points in the drilling fluid line.

4. The apparatus of claim 1 wherein said second signal processing channel means comprises signal subtracting means for subtracting the undelayed signal from said first point from the delayed signal from said second point, means for further delaying this combined signal and signal multiplier means for multiplying this resultant signal by a known predetermined function related to the acoustic transmission properties of said hose section.

5. The apparatus of claim 4 wherein said predetermined function $G(K,\omega)$ by which the combined signal is multiplied is of the form $$G(K,\omega) = \frac{1}{2i \sin} \left[ \frac{a \cos k1 - i(M_1 - a^2 M_2) \sin k1}{a(M_1^{M_2}+1) \cos k1 + i(M_1 + a^2 M_2) \sin k1} \right]$$

where $K = \omega_s/c$ is the wave number of downhole signal pulses of frequency $\omega_s$ travelling at a speed $C$ in the mud system, 1 is the length of said hose section, $M_1$ is the ratio of cross sectional area of said hose to the cross sectional area of the tubing of the mud system on the pump side of said hose section and $M_2$ is the ratio of the cross sectional area of the tubing of the mud system on the opposite side of said hose section from the pump to the cross sectional area of said hose.

6. Apparatus for detecting pressure pulse signals from a downhole signalling device in the drilling fluid circulation system of a drilling well having a mud pump and at least one hose section thereof possessed of different acoustic transmission properties from the tubing comprising other portions of the drilling fluid circulation system, comprising:

means for sensing pressure pulses at two spaced points, a first point and a second point, in a drilling fluid line on the mud pump side of said hose section, said first point being further from said hose section than said second point, and generating signals representative thereof; first signal processing channel means for generating a first intermediate signal representative of the output of a directionally discriminative filter responsive only to signals travelling from said second point toward said first point in the drilling fluid circulation system;

second signal processing channel means for generating a second intermediate signal representative of the effect of signals travelling from said second point toward said first point but caused by signals travelling in the opposite direction and partially reflected from said hose section; and means for combining said two intermediate signals to produce an output signal representative only of signals from said downhole signalling device travelling from said second point toward said first point.

7. The apparatus of claim 6 wherein said second signal processing channel means includes signal processing means functionally relaed to the acoustic transmission properties of said hose section.

8. A method for detecting pressure pulse signals from a downhole signalling device in the mud circulation system of a drilling well, the mud circulation system having a mud pump and at least one hose section thereof possessed of different acoustic transmission properties from the tubing comprising other portions of the mud circulation system, comprising the steps of:

sensing pressure pulses at two spaced points, a first point and a second point on the mud pump side of said hose section in the mud circulation line and generating first and second signals representative thereof;

generating a first intermediate signal representative of the output of a directionally discriminative filter responsive only to signals travelling from said second point toward said first point in the mud circulation system by combining said first and second signals;

generating a second intermediate signal representative of the effect of signals travelling from said second point toward said first point but caused by signals travelling in the opposite direction and partially reflected from said hose section; and combining said intermediate signals to produce an output signal representative only of signals from said downhole signalling device travelling from said second point toward said first point.

9. The method of claim 8 wherein the step of generating said second intermediate signals is performed by combining said first and second signals, delaying the resultant combined signal and multiplying it by a predetermined function of the acoustic transmission properties of said hose section.

10. The method of claim 8 wherein the step of generating said first intermediate signal is performed by supplying said first and second signals simultaneously to the inputs of a differential combining means for the case of signals travelling from said first point toward said second point but supplying said first and second signals at phased intervals of time to the inputs of said differential combining means for the case of signals travelling from said second point toward said first point.

* * * * *